No. 722,922. PATENTED MAR. 17, 1903.
J. A. SMITH.
FISH HOOK.
APPLICATION FILED OCT. 30, 1902.
NO MODEL.
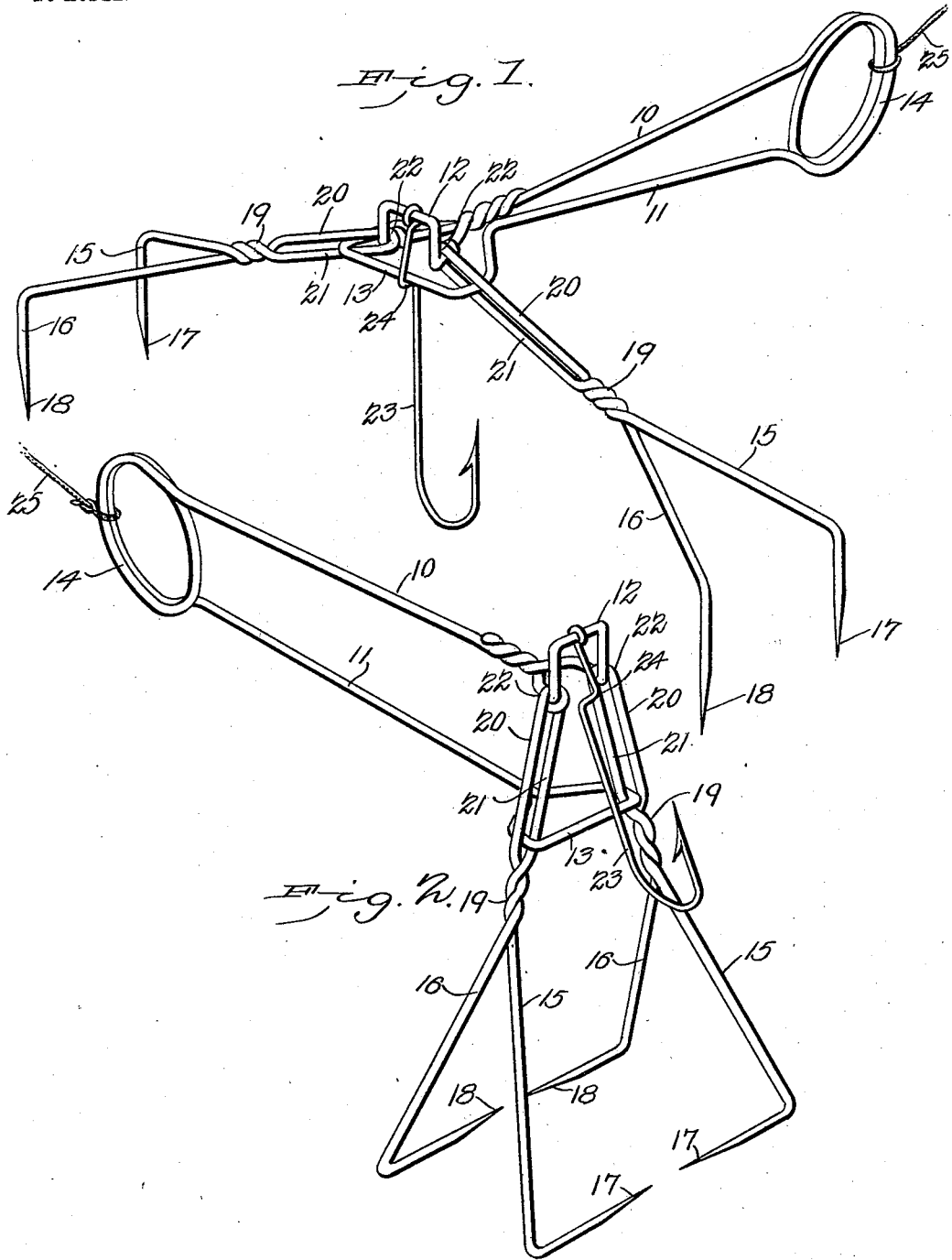

UNITED STATES PATENT OFFICE.

JOHN ALLEN SMITH, OF COMBS, ARKANSAS.

FISH-HOOK.

SPECIFICATION forming part of Letters Patent No. 722,922, dated March 17, 1903.

Application filed October 30, 1902. Serial No. 129,460. (No model.)

*To all whom it may concern:*

Be it known that I, JOHN ALLEN SMITH, a citizen of the United States, residing at Combs, in the county of Madison and State of Arkansas, have invented a new and useful Fish-Hook, of which the following is a specification.

This invention relates to devices employed for catching fish, more particularly, but which may also be employed for catching animals of all kinds, and has for its object the construction of a combined trap and baited hook, the trap releasable by the animal or fish in its efforts to secure the bait.

Another object of the invention is the production of a device which may be very quickly and readily set by the operator and which will be very positive and sure in its action.

The invention consists in certain novel features of construction, as hereinafter shown and described, and specified in the claims.

For the purpose of illustration the invention is shown applied as a fish catcher or trap.

Figure 1 represents a perspective view of the device in its distended or open position, and Fig. 2 represents the device in its closed position.

The improved device comprises two oppositely-disposed spring-actuated grabbing-jaws, with a bait-hook movably disposed between them and provided with a tripping means engaging the jaws and adapted to hold them distended, the releasing of the trip-hook permitting the jaws to be forcibly closed. The grabbing-jaws are supported movably from a framework, preferably formed of a single piece of wire bent to shape and comprising spaced arms 10 11, intermediately connected by a spring-coil 14. The arm 10 terminates in a loop 12, preferably disposed perpendicularly to the plane of the arm, and the arm 11 terminates in a loop 13. By this arrangement it will be obvious that the two members 10 and 11 will be maintained normally in open position by the coil 14. The grabbing-jaw members are movably connected by one end to the loop 12 and are formed with longitudinal slots engaging the loop 13, the movement of the member 11 and its loop 13 actuating the grabber-jaws.

The grabber-jaws are each preferably formed of a single piece of wire bent to shape, and as the jaws are precisely alike corresponding designating characters will be employed for like parts in each.

The jaw members comprise diverging legs 15 16, terminating in pointed ends 17 18 and intertwined at 19 and branching thence at 20 21 and spaced apart, thereby forming a longitudinal slot, and connected by a coil 22, embracing the loop 12, as shown, the loop 13 passing through the slots formed by the portions 20 21. By this arrangement it will be obvious that when the members 10 11 are distended by the force of the spring 14 the loop 13, acting upon the grabber-jaws, will draw them together, as shown in Fig. 2, and likewise when the members 10 11 are compressed the jaw members will be distended, as shown in Fig. 1. Thus by compressing the members 10 11 the jaw members may be distended and "set" by the tripping mechanism.

Movably connected to the loop 12 is a bait-hook 23, having an offset or bend 24, adapted to engage the loop 13 when the members 10 11 are compressed, as shown in Fig. 1, and thus lock the jaw members in their distended position.

The lead-line will be connected to any suitable part of the framework, preferably to the coil 14, as indicated at 25.

When the device is to be used, the bait will be attached to the hook 23 and the members 10 11 compressed and the hook engaged with the loop 13 by its offset 24.

Any attempt to remove the bait or to even come in contact with the hook will release the offset 24 and permit the jaw members to be forcibly closed and catch the fish or animal between them.

The offset 24 may be so constructed that a very slight "nibble" will be sufficient to release the grabber-jaws, so that the action will be very certain and efficient.

The whole device may be constructed of wire, preferably steel, but may be constructed of other suitable metal, if preferred.

The construction is extremely simple, and the device may be manufactured very cheaply and yet with sufficient strength to meet all the requirements.

The parts may be modified in relative proportions and in other minor details without departing from the principle of the invention or sacrificing any of its advantages, and I reserve the right, therefore, to such alterations and modifications as may come within the scope of the claims.

Having thus described the invention, what is claimed is—

1. In a device of the class described, a framework having arms, one of which is spring-actuated and movable relatively to the other, oppositely-disposed grabbing-jaws movably connected to one of said arms and operatively engaged by the other arm, and a bait-hook movably connected to one of said arms and provided with a trip means detachably engaging the other arm, whereby said grabbing-jaws are released by the movement of said bait-hook.

2. In a device of the class described, a framework having arms, one of which is spring-actuated and movable relatively to the other, oppositely-disposed grabbing-jaws movably engaging one of said arms and having longitudinal slots engaged by the other arm, and a bait-hook movably connected to one of said arms and provided with trip means detachably engaging the other arm, whereby said grabbing-jaws are operated by said arms and released by the movement of said bait-hook.

3. In a device of the class described, a supporting-frame comprising arms, one of which is spring-operated and movable relatively to the other and terminating in a loop, oppositely-disposed grabbing-jaws movably engaging the other arm and having longitudinal slots engaged by said loop, and a bait-hook movably engaging one of said arms and provided with an intermediate bend for engaging the loop of the other arm, whereby the arms are held in position to maintain said grabbing-jaws distended and releasable by the movement of said bait-hook.

4. In a device of the class described, a supporting-frame formed of a single piece of wire bent to shape and comprising spaced arms terminating in loops and connected by an intermediate coil, oppositely-disposed grabbing-jaws movably connected to one of said terminal loops and operatively engaged by the other terminal loop, and a bait-hook movably connected to the terminal loop which supports said grabbing-jaws and provided with a catch detachably engaging the other of said terminal loops whereby said jaw members may be maintained in their distended position and releasable by the movement of said bait-hook, substantially as described.

5. In a device of the class described, a framework formed of a stationary arm and a spring-operated movable arm, oppositely-disposed grabbing-jaws each formed of a single piece of wire bent to shape and comprising spaced members terminating in inwardly-bent pointed ends and connected by coils movably engaging said stationary arm and with a central portion entwisted and formed with longitudinal guideways movably engaging said movable arm, and a bait-hook movably connected to said stationary arm and provided with a catch engaging said movable arm, substantially as described.

In testimony that I claim the foregoing as my own I have hereto affixed my signature in the presence of two witnesses.

JOHN ALLEN SMITH.

Witnesses:
CHARLES POTTS,
H. C. SMITH.